United States Patent
Corbett et al.

(10) Patent No.: US 7,603,553 B1
(45) Date of Patent: Oct. 13, 2009

(54) SYSTEM AND METHOD TO MAKE FILE HANDLES OPAQUE TO CLIENTS

(75) Inventors: Peter F. Corbett, Lexington, MA (US); David B. Noveck, Lexington, MA (US)

(73) Assignee: NetApp, Inc., Sunnyvale, CA (US)

( * ) Notice: Subject to any disclaimer, the term of this patent is extended or adjusted under 35 U.S.C. 154(b) by 583 days.

(21) Appl. No.: 10/423,591

(22) Filed: Apr. 25, 2003

(51) Int. Cl.
*H04L 9/00* (2006.01)
*G06F 17/30* (2006.01)

(52) U.S. Cl. .................... 713/165; 713/164; 707/1; 726/26

(58) Field of Classification Search .................. 713/165
See application file for complete search history.

(56) References Cited

U.S. PATENT DOCUMENTS

| | | | |
|---|---|---|---|
| 5,163,131 A | 11/1992 | Row et al. | |
| 5,355,453 A | 10/1994 | Row et al. | |
| 5,485,579 A | 1/1996 | Hitz et al. | |
| 5,742,817 A * | 4/1998 | Pinkoski | 707/200 |
| 5,802,366 A | 9/1998 | Row et al. | |
| 5,819,292 A | 10/1998 | Hitz et al. | |
| 5,897,637 A * | 4/1999 | Guha | 707/101 |
| 5,931,918 A | 8/1999 | Row et al. | |
| 5,941,972 A | 8/1999 | Hoese et al. | |
| 5,948,110 A | 9/1999 | Hitz et al. | |
| 5,950,225 A | 9/1999 | Kleiman | |
| 5,963,962 A | 10/1999 | Hitz et al. | |
| 6,038,570 A | 3/2000 | Hitz et al. | |
| 6,065,037 A | 5/2000 | Hitz et al. | |
| 6,138,126 A | 10/2000 | Hitz et al. | |
| 6,289,356 B1 | 9/2001 | Hitz et al. | |
| 6,425,035 B2 | 7/2002 | Hoese et al. | |
| 6,505,236 B1 * | 1/2003 | Pollack | 709/206 |
| 2002/0019851 A1 * | 2/2002 | Pollack | 709/206 |
| 2003/0061278 A1 * | 3/2003 | Agarwalla et al. | 709/203 |
| 2003/0088783 A1 * | 5/2003 | DiPierro | 713/189 |
| 2004/0117600 A1 * | 6/2004 | Bodas et al. | 712/210 |

OTHER PUBLICATIONS

David Hitz et al. TR3002 File System Design for a NFS File Server Appliance published by Network Appliance, Inc.
Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.
Fielding et al. (1999) Request for Comments (RPC) 2616, HTTP/1.1.

* cited by examiner

*Primary Examiner*—Ponnoreay Pich
(74) *Attorney, Agent, or Firm*—Cesari and McKenna, LLP

(57) ABSTRACT

A system and method to make file handles opaque to other network devices is provided. The system and method encrypts a file handle after it is generated and returns the encrypted file handle to a requesting client. The system and method may also generate a hash table storing hash key, a copy of the encrypted file handle and a copy of the unencrypted file handle. Upon a later receipt of an encrypted file handle, the system and method may hash the encrypted file handle to identify an appropriate hash table entry and it's associated unencrypted hash key. Alternately, the system may decrypt every received encrypted file handle and not utilize a hash table.

29 Claims, 6 Drawing Sheets

SYSTEM AND METHOD TO MAKE FILE HANDLES OPAQUE TO CLIENTS

FIELD OF THE INVENTION

The present invention relates to network security and, more particularly to making file handles opaque to clients in a network.

BACKGROUND OF THE INVENTION

A file server is a computer that provides file service relating to the organization of information on storage devices, such as disks. The file server or filer includes a storage operating system that implements a file system to logically organize the information as a hierarchical structure of directories and files on the disks. Each "on-disk" file may be implemented as a set of disk blocks configured to store information, such as text, whereas the directory may be implemented as a specially-formatted file in which information about other files and directories are stored. A filer may be configured to operate according to a client/server model of information delivery to thereby allow many clients to access files stored on a server, e.g., the filer. In this model, the client may comprise an application, such as a file system protocol, executing on a computer that "connects" to the filer over a computer network, such as a point-to-point link, shared local area network (LAN), wide area network (WAN), or virtual private network (VPN) implemented over a public network such as the Internet. Each client may request the services of the filer by issuing file system protocol messages (in the form of packets) to the filer over the network.

A common type of file system is a "write in-place" file system, an example of which is the conventional Berkeley fast file system. In a write in-place file system, the locations of the data structures, such as inodes and data blocks, on disk are typically fixed. An inode is a data structure used to store information, such as metadata, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not overwrite data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a write-anywhere file system that is configured to operate on a filer is the Write Anywhere File Layout (WAFL™) file system available from Network Appliance, Inc. of Sunnyvale, Calif. The WAFL file system is implemented within a microkernel as part of the overall protocol stack of the filer and associated disk storage. This microkernel is supplied as part of Network Appliance's Data ONTAP™ storage operating system, residing on the filer, that processes file-service requests from network-attached clients.

As used herein, the term "storage operating system" generally refers to the computer-executable code operable on a storage system that manages data access and may, in case of a filer, implement file system semantics, such as the Data ONTAP™ storage operating system, which is implemented as a microkernel. The Data ONTAP storage operating system is available from Network Appliance, Inc., of Sunnyvale, Calif., and implements a Write Anywhere File Layout (WAFL™) file system. The storage operating system can also be implemented as an application program operating over a general-purpose operating system, such as UNIX® or Windows NT®, or as a general-purpose operating system with configurable functionality, which is configured for storage applications as described herein.

Disk storage is typically implemented as one or more storage "volumes" that comprise physical storage disks, defining an overall logical arrangement of storage space. Currently available filer implementations can serve a large number of discrete volumes (150 or more, for example). Each volume is associated with its own file system and, for purposes hereof, volume and file system shall generally be used synonymously. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of parity information with respect to the striped data. In the example of a WAFL file system, a RAID 4 level implementation is advantageously employed. This implementation specifically entails the striping of data across a group of disks, and separate parity storing within a selected disk of the RAID group. As described herein, a volume typically comprises at least one data disk and one associated parity disk (or possibly data/parity) partitions in a single disk arranged according to a RAID 4, or equivalent high-reliability, implementation.

A client of the file server may request that a file stored on the file server is opened through the use of conventional file-based protocols. In response to such a file-based protocol Open, the file server will return a file handle. The file handle is, in the example of the Network File System (NFS), a 32-byte value that uniquely identifies the opened file. In current NFS implementations, the file handle contains, in binary form, the export point and an inode number of the file associated with the file handle. This information may be easily decoded by a client or network eavesdropper and used to forge a file handle. A client or network eavesdropper could utilize this information to forge a file handle that, could, for example, bypass the security controls on the file's actual export point by co-opting a different and less secure export point into the file handle. As used herein, an "export point" is a file protocol accessible path forming a base or root for lower directory levels. For example, a file may be accessible and have an export point of, /usr/dir/file. Alternately, an attacker, whether a client or other network eavesdropper, may, by analyzing a large number of file handles, be able to reverse engineer the file handle construction method, thereby enabling it to forge or otherwise compromise the security of the file server.

Security has long been an issue with NFS and various techniques have been employed to prevent unauthorized access. However, many of these techniques require additional password distribution schemes and/or user action to implement. These requirements typically complicate the use of a storage system for a user.

Thus, it would be desirable to enable the file server to make the data contained within the file handle opaque to clients or other devices on the network without requiring additional user actions.

SUMMARY OF THE INVENTION

The disadvantages of the prior art are overcome by providing the system and method making file handles opaque to clients in a network environment. By "opaque" it is meant that network devices are incapable of retrieving any file system or other file-related information from the file handle. The system and method encrypts file handles issued by a file server before transmitting them to the client. Clients may still utilize the encrypted file handle as a unique identifier of a given file in a file system. However, clients are unable to obtain any information stored within the encrypted file handle itself.

In an illustrative embodiment, the file server maintains a hash table using a selected set of bits of the encrypted file handle as a hash key. The hash table includes the hash key, the encrypted file handle for use as a check and the unencrypted file handle. When a client issues a request to a file server utilizing the encrypted file, the file server will hash the selected bits into the hash table to identify an appropriate entry. The received encrypted file handle is then compared against the encrypted file handle stored in the hash table to verify that the hash function has correctly identified the appropriate file handle. The file server may then access the non-encrypted version of the file handle from the hash table, thereby eliminating the need to run a decrypting algorithm on the encrypted file handle. This process improves the speed at which file handles may be processed, while ensuring that the appropriate level of security is maintained.

In an alternative embodiment, each incoming encrypted file handle is individually decrypted and no hash table, or other form of caching encrypted/decrypted pairs, is utilized. Alternately, an alternative data structure, such as a B-tree, may be utilized to cache known encrypted file handles and their decrypted counterparts. In another embodiment, the storage operating system maintains a complete set of outstanding encrypted file handles and their associated decrypted counterparts. It should be noted that many descriptions of NFS file handles, including the NFS specifications describe them as "opaque," indicating thereby merely that the specification defines no information which may legitimately and reliably be determined from an examination of the file handle. The desired opacity which is needed goes beyond that in making it impossible to obtain such information, by denying the client (or any eavesdroppers) the capacity to obtain such information or formulate a file handle, even though the file handle contains the necessary information when it is examined by the server.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN ILLUSTRATIVE EMBODIMENT

A. File Server and Network Environment

Figure 1:
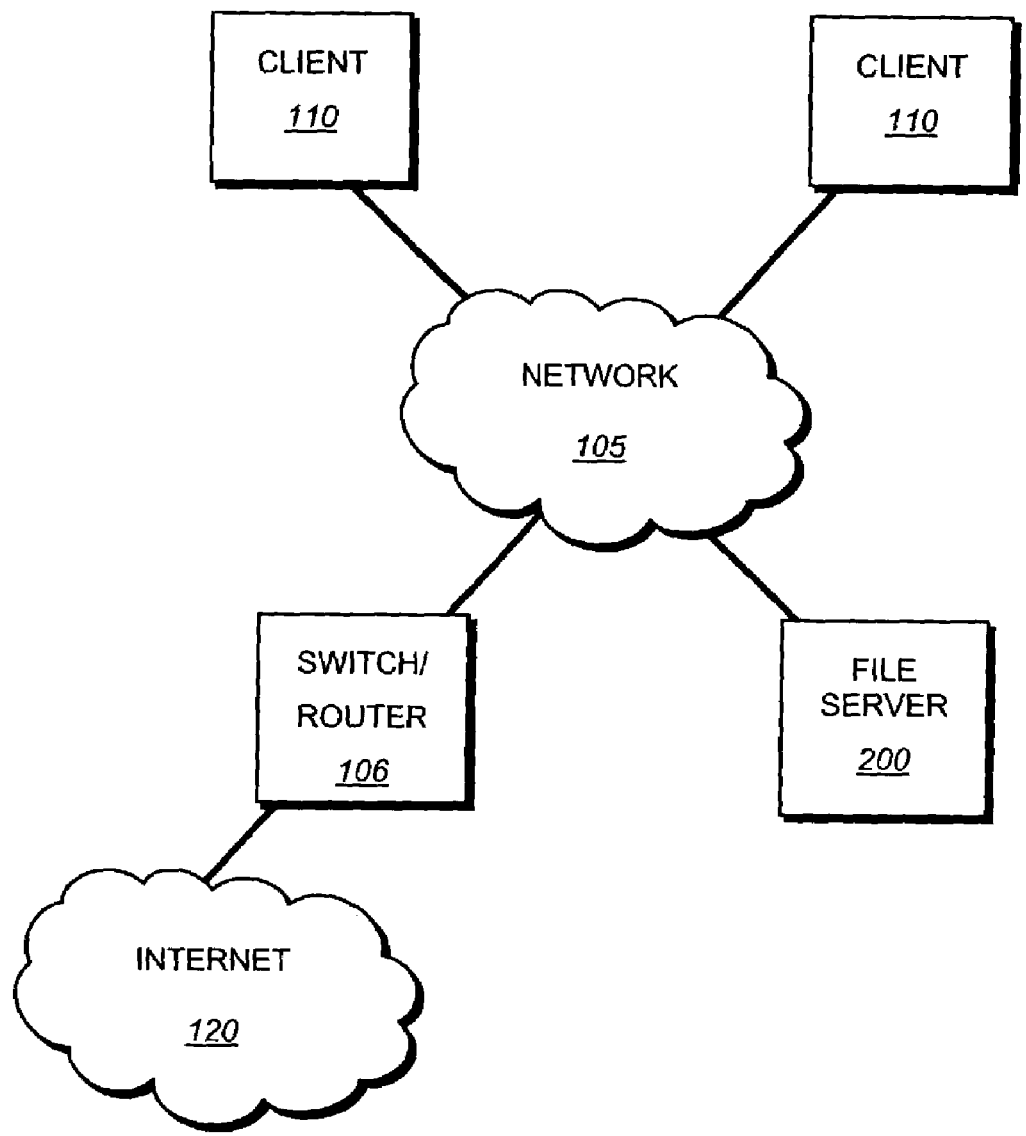
FIG. 1 is a schematic block diagram of an exemplary network environment having clients and file servers.

The FIG. 1 is a schematic block diagram of an exemplary network environment 100 in which the principles of the present invention may be practiced. The network environment 100 centers around a network 105. The network 105 may be a local area network (LAN), a wide area network (WAN) or a virtual private network (VPN) or a combination thereof. Connected to the network are a plurality of clients 110, that may include personal computers (PCs), application servers or other network devices. Also connected to the network 105 is a file server 200, described further below. The network 105 may also be connected with a switch end/or router 115 that provides a gateway to the well-known Internet 120.

Figure 2:
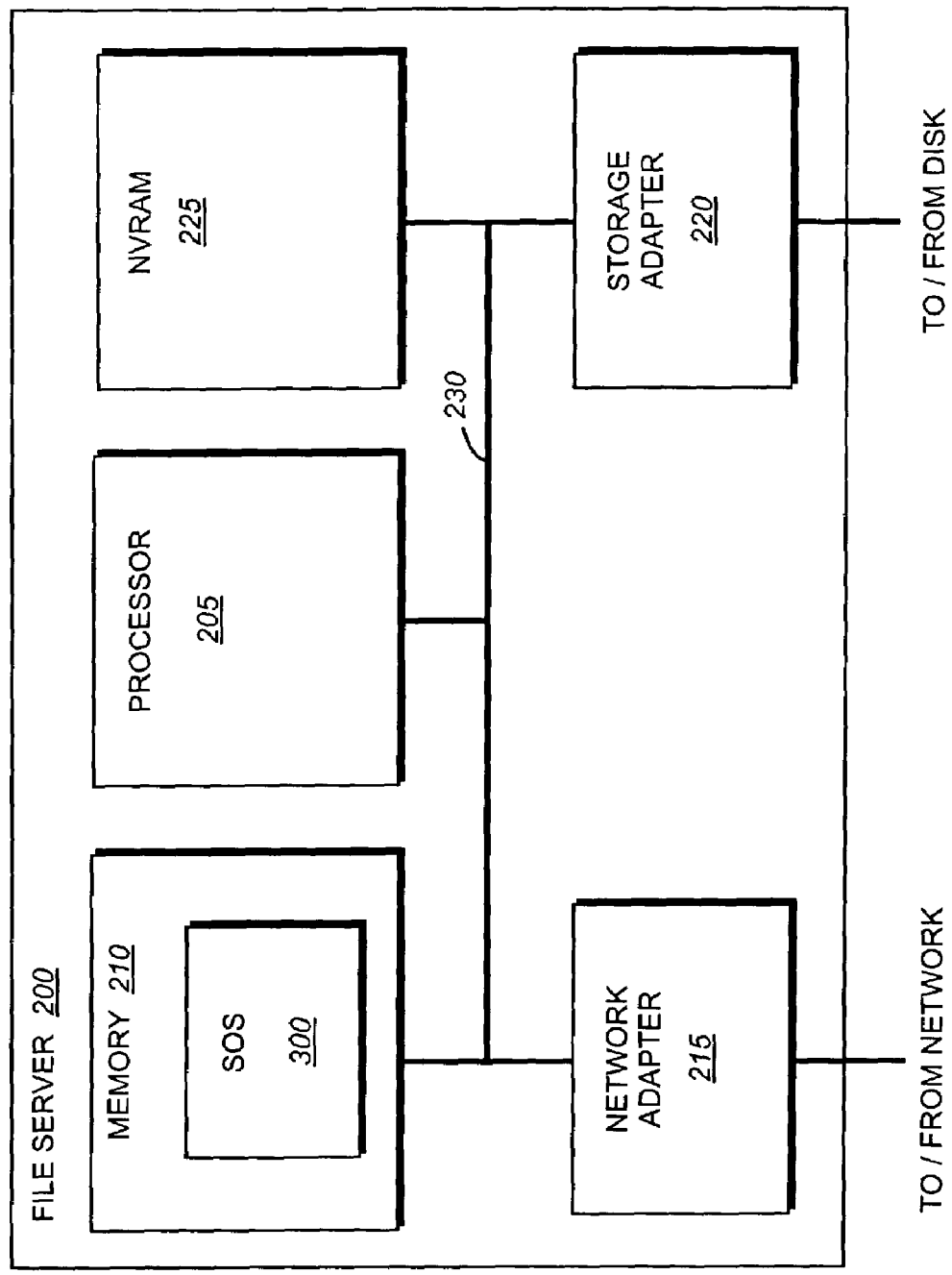
FIG. 2 is a schematic block diagram of an exemplary file server in accordance with an embodiment of the present invention.

An exemplary file server, or filer, architecture is now described in further detail. FIG. 2 is a more-detailed schematic block diagram of an exemplary file server 200 implemented as a network storage appliance, such as the NetApp® filer available from Network Appliance, that is advantageously used with the present invention. By way of background, a network storage appliance is a special-purpose computer that provides file service relating to the organization of information on storage devices, such as disks. However, it will be understood by those skilled in the art that the inventive concepts described herein may apply to any type of filer whether implemented as a special-purpose or general-purpose computer, including a standalone computer. The filer 200 comprises a processor 205, a memory 210, a network adapter 215 and a storage adapter 220 interconnected by a system bus 230. The filer 200 also includes a storage operating system 300 that implements a file system to logically organize the information as a hierarchical structure of directories and files on the disks.

In the illustrative embodiment, the memory 210 may have storage locations that are addressable by the processor and adapters for storing software program code and data structures associated with the present invention. The processor and adapters may, in turn, comprise processing elements and/or logic circuitry configured to execute the software code and manipulate the data structures. The storage operating system (SOS) 300, portions of which are typically resident in memory and executed by the processing elements, functionally organizes the filer 200 by, inter alia, invoking storage operations in support of a file service implemented by the filer. It will be apparent to those skilled in the art that other processing and memory means, including various computer readable media, may be used for storing and executing program instructions pertaining to the inventive technique described herein.

The storage adapter 220 cooperates with the storage operating system 230 executing on the filer to access information requested by the client. The storage adapter 220 includes input/output (I/O) interface circuitry that couples to the disks over an I/O interconnect arrangement, such as a conventional high-performance, Fibre Channel serial link topology. The information is retrieved by the storage adapter 220 and, if necessary, processed by the processor 205 (or the adapter itself) prior to being forwarded over the system bus 230 to the network adapter 215, where the information is formatted into a packet and returned to the client.

The filer 200 may also include a nonvolatile random access memory (NVRAM) 225 that provides fault-tolerant backup of data, enabling the integrity of filer transactions to survive a service interruption based upon a power failure, or other fault. The NVRAM 225 is typically made sufficiently large to log a certain time-based chunk of transactions (for example, several seconds worth). The NVRAM entry may be constructed in parallel with execution of the corresponding request, once it is determined that a request will be successfully performed but it must be completed (as must any copying to mirror NVRAM of the partner in a cluster configuration) before the result of the request is returned to the requesting client.

B. Storage Operating System

The storage operating system 300 implements a file system that logically organizes information as a hierarchical structure of directories and files on the disks. Each "on-disk" file may be implemented as set of disk blocks configured to store information, such as text, whereas the directory may be implemented as a specially formatted file in which other files and directories are stored. In the illustrative embodiment described herein, the storage operating system 300 associated with each volume is, for example, the NetApp® Data ONTAP™ operating system available from Network Appliance, Inc. of Sunnyvale, Calif. that implements a Write Anywhere File Layout (WAFL) file system. The preferred storage operating system for the exemplary filer is now described briefly. However, it is expressly contemplated that the principles of this invention can be implemented using a variety of alternate storage operating system architectures.

Figure 3:
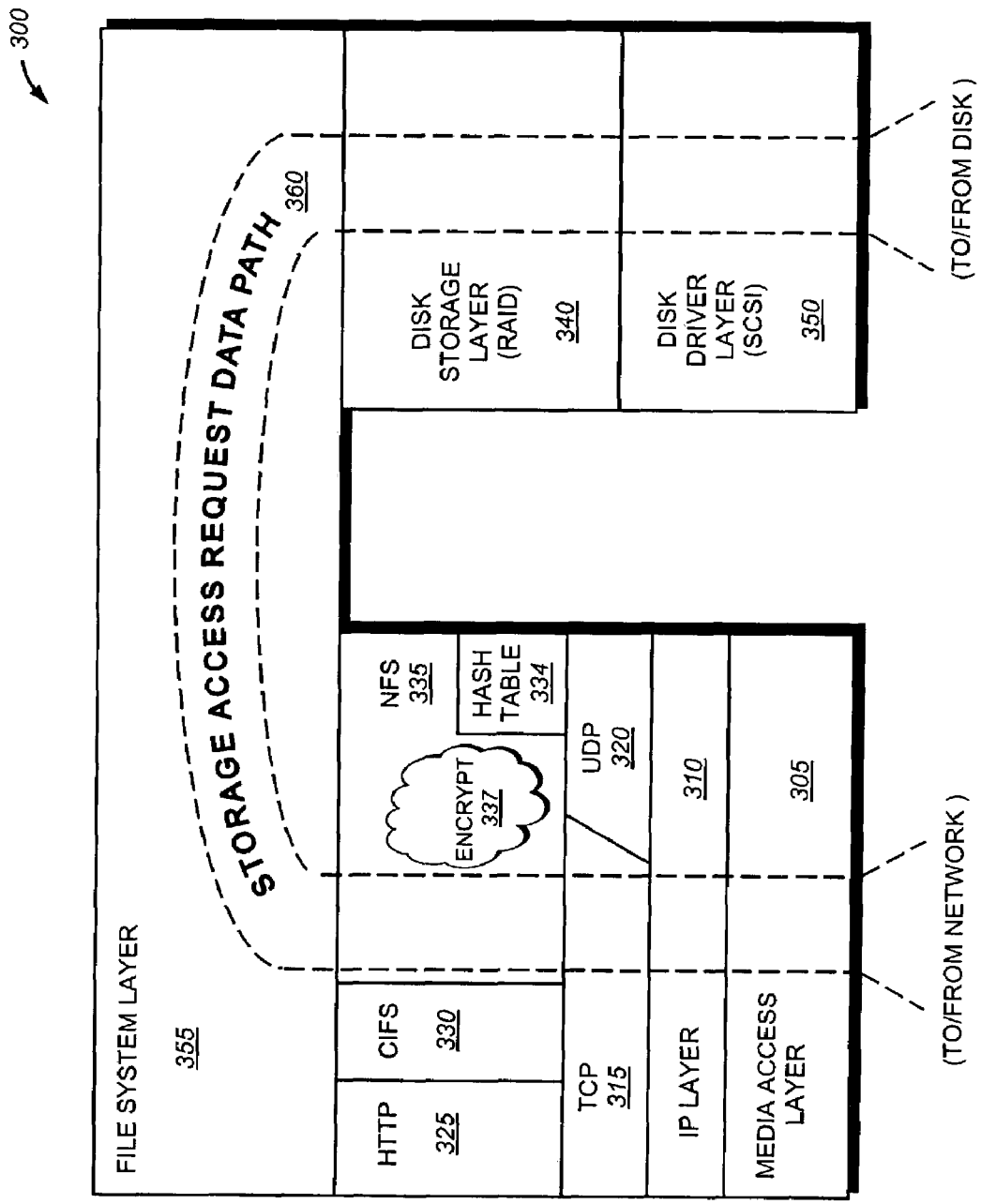
FIG. 3 is a schematic block diagram of an exemplary storage operating system executing on a file server in accordance with an embodiment of the present invention.

As shown in FIG. 3, the storage operating system 300 comprises a series of software layers, including a media access layer 305 of network drivers (e.g., an Ethernet driver). The storage operating system 300 further includes network protocol layers, such as the IP layer 310 and its TCP layer 315, and UDP layer 320. A file system protocol layer provides multi-protocol data access and, to that end, includes support for the CIFS protocol 330, the Network File System (NFS) protocol 335 and the HTTP protocol 325. In addition, the storage operating system 300 includes a disk storage layer 345 that implements a disk storage protocol, such as a RAID protocol, and a disk driver layer 350 that implements a disk access protocol such as, e.g., a Small Computer Systems Interface (SCSI) protocol.

Included within the NFS layer is an encryption/decryption function 337 and an associated hash table 339, described further below. The encryption/decryption function 337 described further below, implements the novel file handle encryption and decryption system and method of the present invention. It should be noted that the encryption/decryption function 337 is shown in the NFS layer for exemplary purposes only. The novel encryption/decryption function may be implemented in any file-based protocol layer of a storage operation system.

Bridging the disk software layers with the network and file system protocol layers is a file system layer 355 of the storage operating system. Generally, the layer implements a file system having an on-disk format representation that is block-based using, e.g., 4-kilobyte (KB) data blocks and using inodes to describe the files. In response to transaction requests, the file system generates operations to load (retrieve) the requested data from volumes if it is not resident "in-core", i.e., in the filer's memory 210. If the information is not in memory, the file system layer 355 indexes into the inode file using the inode number to access an appropriate entry and retrieve a logical volume block number. The layer 355 then passes the logical volume block number to the disk storage (RAID) layer 345, which maps that logical number to a disk block number and sends the latter to an appropriate driver (for example, an encapsulation of SCSI implemented on a fibre channel disk interconnection) of the disk driver layer 350. The disk driver accesses the disk block number from volumes and loads the requested data in memory 210 for processing by the filer 200. Upon completion of the request, the filer (and storage operating system) returns a reply, e.g., a conventional acknowledgement packet defined by the CIFS specification, to the client 110.

It should be noted that the software "path" 360 through the storage operating system layers described above needed to perform data storage access for the client request received at the filer may alternatively be implemented in hardware or a combination of hardware and software.

Figure 4:
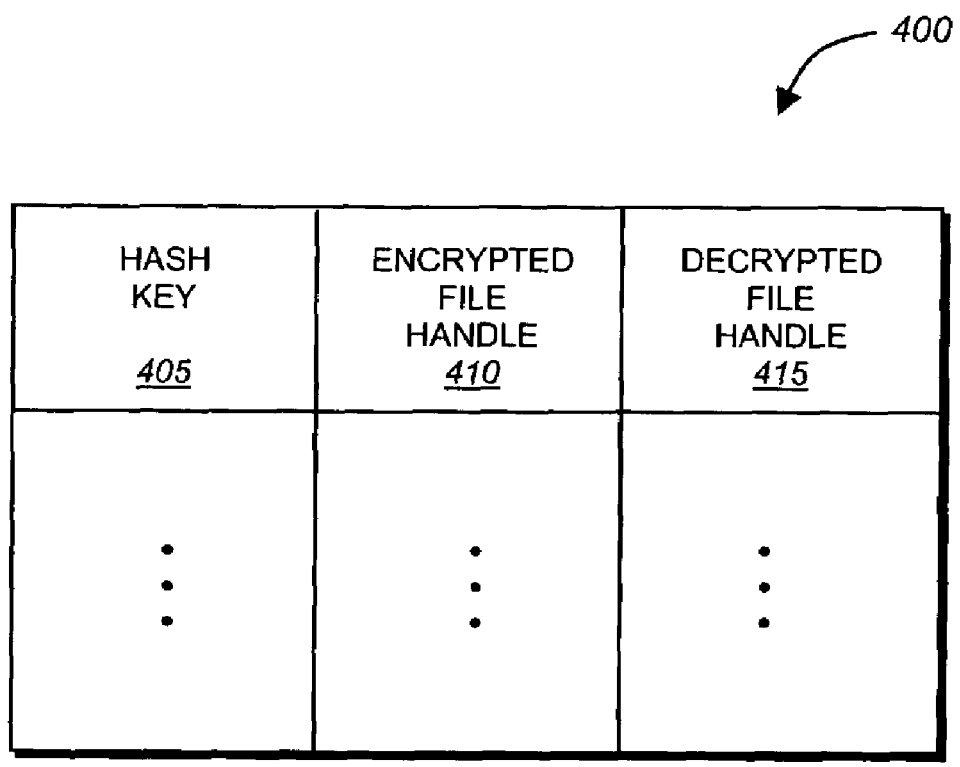
FIG. 4 is a schematic block diagram of an exemplary hash table in accordance with an embodiment of the present invention.

A schematic block diagram of an exemplary hash table 400 for use in an illustrative embodiment is shown in FIG. 4. The hash table 400, which is stored in the file protocol layer of the storage operating system in an illustrative embodiment, includes entries for a hash key 405, an encrypted file handle 410 and a decrypted file handle 415. The hash key 405, in the illustrative embodiment, is a subset of the bits of the encrypted file handle. As the encryption process should produce a uniform distribution of bits within the encrypted file handle, utilizing a subset as a hash key will provide for performance enhancements. The encrypted file handle entry 410 contains a complete encrypted file handle for use as a second-level verification that the proper entry in the hash table 400 has been selected. It is possible for differing file handles to be encrypted and to have identical hash keys. Thus, in accordance with the illustrative embodiment, the novel system and method will compare the encrypted file handle received by a client with the stored encrypted file handle and entry 410. The decrypted file handle entry 415 contains the original file handle associated with the given file. The decrypted file handle 415 is utilized by the storage operating system internally for referencing the designated file. By storing the decrypted file handle in the hash table 400, the storage operating system eliminates the need to run a decryption algorithm on a received encrypted file handle for those file handles that are found in the hash table, thereby improving system performance by reducing the number of cryptographic computations that must be performed.

It should be noted that the use of a hash table is for illustrative purposes only. In alternate embodiments, a B-tree or other form of data structure may be utilized to store encrypted file handles and their decrypted counterparts. Alternately, the storage operating system may individually decrypt each received encrypted file handle. As such, the use of a hash table should be taken as an exemplary embodiment only.

Additionally, it should also be noted that the hash table, or other alternate data structure, may be complete, i.e., contain all outstanding file handles, or partial. A data structure is partial if it contains a subset of all outstanding file handles. If the hash table or other data structure is partial, and the storage operating system receives an encrypted file handle directed to a file handle that is not in the data structure, then the storage operating system may run a decryption algorithm on the received encrypted file handle to obtain a decrypted copy for servicing the requested operation.

C. Encryption of File Handles

The encryption process 337 within the NFS layer 335 of the storage operating system 300 works to ensure that file handles that are returned to a client over a network are opaque to interceptors or other network devices. By "opaque" it is meant that network devices are incapable of retrieving any file system or other file-related information from the file handle.

Figure 5:
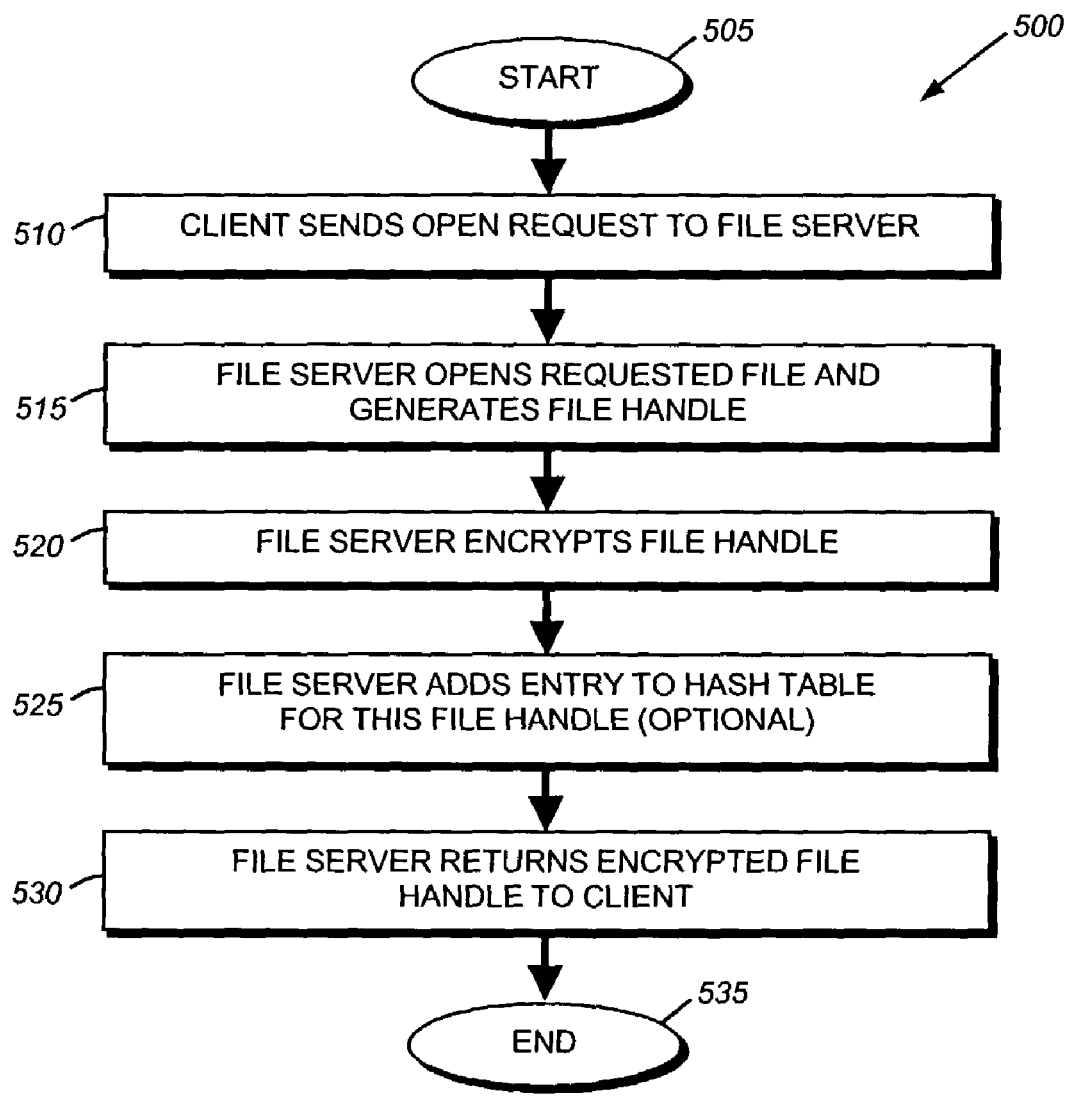
FIG. 5 is a flow chart detailing the steps of a procedure for encrypting a file handle in accordance with an embodiment of the present invention.

The steps of a procedure 500 for initially creating an encrypted file handle in accordance with an illustrative embodiment of the present invention is shown in FIG. 5. The procedure begins in step 505 which can be initiated by receipt of a file-based protocol Open command by the storage operating system. The procedure 500 then proceeds to step 510 where a client sends a file open request to the file server. This open request is directed to a specific file being managed by the file server and may be sent using any acceptable file-based protocol. This description is written in terms of the NFS protocol, however it is understood that any protocol may be utilized with the teachings of the present invention. In response to receipt of the open request, the file server, in step 515, opens the requested file and generates a file handle using conventional file system routines and procedures. Next, the file server encrypts the file handle in step 520. This encryption may occur using any encryption method, including, for example, a known private key or public key encryption system. In accordance with the illustrative embodiment of the present invention, only the file server will decrypt the file handle. Thus, in the illustrative embodiment, there is no need for a key management or a distribution system. The file server may select as a key any acceptable key. For example, during the initialization the file server may hash using a conventional hash function the date and/or time to generate an encryption key. The server may utilize any of several well-known private key or public key encryption algorithms, such as DES, to encrypt the file handle. Since the file handle is both encrypted and decrypted by the server, and never decrypted by the client, a private key algorithm will be simplest to implement.

Next, in step 525, the file server optionally adds a new entry to the hash table. This new entry identifies the file handle, the encrypted file handle and a hash key. The hash key may be a subset of bits of the encrypted file handle or may be computed from the encrypted file handle using a variety of methods.

As noted above, the use of a hash table is optional and for exemplary purposes only. In an alternate embodiment, the storage system does not maintain copies of the encrypted file handles. In such an embodiment, all incoming encrypted file handles will need to be decrypted. In other alternative embodiments, other data structures, such as a B-tree, may be utilized to store the encrypted file handle. In those alternative embodiments, the data structure, for example a B-tree, is populated in place of the hash tree in this step of the procedure.

After the hash table has been updated, the file server then returns an encrypted file handle to the client in step 530. The file server returns the encrypted file handle using conventional file system procedures. Once the encrypted file handle has been returned to the client, the procedure is complete (step 535). When, during the course of file system operation, a file handle is deleted by, for example, a client closing a file, the file protocol layer removes the appropriate file handle entry from the hash table.

Figure 6:
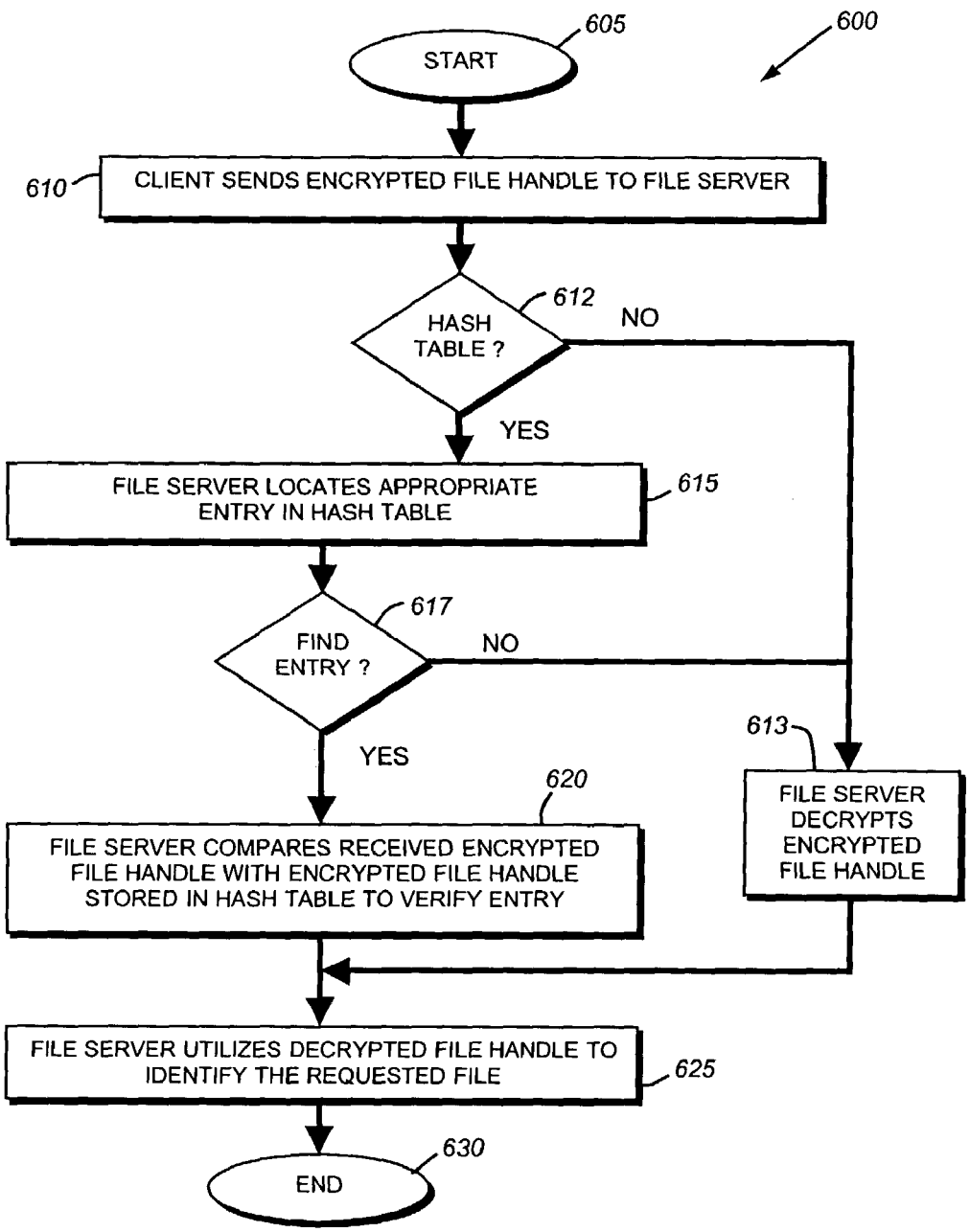
FIG. 6 is a flow chart detailing the steps of a procedure for processing a request from a client using an encrypted file handle in accordance with an embodiment of the present invention.

During later file system operation, when a client desires to access a file, it returns the encrypted file handle to the file server as if it was a conventional unencrypted file handle. The steps of a procedure 600 performed by the file server in response to such a procedure is shown in FIG. 6. The procedure begins in step 605 and proceeds to step 610 where the client sends the encrypted file handle to the file server. This may be in the context of a read or write operation or may be for any file system operation that requires a file handle to identify the file to be operated upon.

Then, in step 612, the procedure determines if a hash table is being used and if no hash table is being used, the procedure then branches to step 613 where the file server decrypts the received encrypted file handle. Upon receipt of the encrypted file handle, the file server uses the selected subset of the encrypted file handle as a hash key to locate an entry in the hash table (step 615) if one exists. In step 617, the file server determines if an entry was found in the hash table. If no entry was found, then the hash table or other data structure is not complete and the procedure branches to step 613 to decrypt the received file handle. If, however, an entry is found in step 617, the file server then compares the received encrypted file handle with the encrypted file handle that is stored in the hash table associated with the entry affiliated with the hash key in step 620. This comparison is utilized to verify that the proper entry has been selected in the event that a plurality of entries has identical hash keys.

It should be noted that steps 612, 615, 617 and 620 are exemplary only. In an alternate embodiment, the fileserver may decrypt the encrypted file handle. In another alternate embodiment, the file server may maintain a look up table that includes a complete set of pairs of encrypted file handles and their clear text counterparts. In such an embodiment, no received encrypted file handles are actually decrypted as the file server utilizes the look up table.

The file server then utilizes, in step 625, the decrypted file handle to identify the requested file. This decrypted file handle is passed to other layers or procedures within the file protocol layer to perform the requested operation. The procedure is then complete in step 630.

Thus, clients of the file server utilizing the teachings of the present invention only have access to the encrypted file handle. As such, clients will be unable to obtain file system or file protocol information from the file handle. This reduces the capability of a network attacker from being able to masquerade as an authorized user of a given file.

As the file server is the only device that needs to decrypt the file handle, the encryption key does not need to be distributed, thereby eliminating the need for a key distribution and management system. However, in the event that the file server is a member of a file server cluster, the file server's cluster partner must have access to the encryption key. The file server's cluster partner requires the key to be able to successfully accomplish a failover operation should one of the file servers in a cluster encounter an error condition. The cluster partner file server may receive the encryption key via any form of secure communication including, for example, an encrypted message from the cluster partner's file server. Alternately, during the configuration of the cluster, the administrator may set the file server encryption key to be common among all members of a cluster of servers, where the servers are cooperating in such a way that the encrypted file handle may, under certain circumstances, be presented to any of the servers. More generally, the encryption key must be available to any network device that could legitimately see the file handle. Such devices must be able to properly associate the encryption key to the file handle.

To again summarize, the present invention is directed to a system and method for making file handles opaque to clients and other devices in a network. When a file handle is initially generated at the request of a client of a file server opening a specified file, the file handle is encrypted. In the illustrative embodiment, this encrypted file handle, along with a hash key and a decrypted file handle are stored in a hash table in the file server. When a client desires to access a specified file, the client transmits the encrypted file handle to the file server in conjunction with a file protocol operation. The file server utilizes the hash key, which in the illustrative embodiment is a subset of bits of the encrypted file handle, to identify an entry in its hash table. The received encrypted file handle is then compared against a stored copy of the encrypted file handle in the hash table to verify that the correct entry has been identified. Once the correct entry has been identified, the file server utilizes the unencrypted version of the file handle stored in the hash table for use in processing the file service or file operation request from the client.

In an alternate embodiment, no hash table or other lookup table or data structure is utilized. Instead, each received encrypted file handle is individually decrypted before being utilized by the file server to identify a given file. In other alternate embodiments, data structures other than a hash table, including, for example, a B-tree, may be utilized to store pairs of encrypted file handles and their decrypted counterparts. In a further alternate embodiment, the file server may maintain a complete lookup table of each encrypted file handle and its associated unencrypted counterpart. In such an alternate embodiment, whenever an encrypted file handle is received, the file server utilizes the lookup table to identify the decrypted file handle for use in performing the requested file system operation.

As the only file handle that is transmitted across any network is the encrypted file handle, clients or other devices listening on the network are not able to obtain information that potentially could threaten security from a transmitted unencrypted file handle.

The forgoing has been a detailed description of the illustrative embodiment of the invention. Various modifications and additions can be made without departing from the spirit and scope of the invention. For example, it is understood that the various data structures and inodes can include additional fields and/or be generated or managed by differing layers of a storage operating system while remaining within the scope of the present invention. Additionally, while this description has been written and referenced to file servers and filers, the principles are equally pertinent to all types of computers. Further, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention.

What is claimed is:

1. A method for making file handles opaque to devices connected to the network, the method comprising:
   maintaining a hash table, the hash table including one or more hash key entries, one or more encrypted file handle entries, and one or more decrypted file handle entries;
   generating a file handle associated with a specific file;
   encrypting the file handle by a file server to create an encrypted file handle, thereby preventing access to the file handle;
   returning the encrypted file handle to a device that requested access to the specific file;
   transmitting to the file server, by the device, the encrypted file handle and a file operation;
   generating a hash key from the encrypted file handle to locate a hash key entry in the hash table;
   in response to determining that the hash key entry exists, comparing the encrypted file handle to the one or more encrypted file handle entries associated with the hash key entry to find a matching encrypted file handle entry, the matching encrypted file handle entry having a corresponding decrypted file handle entry in the hash table; and
   processing, by the file server, the file operation upon the specific file obtained from the corresponding decrypted file handle entry.

2. The method of claim 1 wherein the step of encrypting the file handle further comprises encrypting the file handle using a private key encryption algorithm.

3. The method of claim 1 wherein the step of encrypting the file handle further comprises encrypting the file handle using a public key encryption algorithm.

4. The method of claim 1 further comprising creating a new entry, in the hash table, associated with the encrypted file handle in response to determining that no hash key entry associated with the encrypted file handle exists in the hash table.

5. The method of claim 4 wherein the step of creating further comprises:
   selecting a new hash key and inserting the new hash key into the new entry; and
   placing an unencrypted file handle in the hash table as a decrypted file handle entry, whereby the new hash key, encrypted file handle and the unencrypted file handle are associated as a single entry in the hash table.

6. The method of claim 5 wherein the hash key further comprises a subset of the encrypted file handle.

7. The method of claim 1, further comprising:
   using a 32-byte value as the file handle that uniquely identifies the specific file.

8. The method of claim 1, further comprising:
   including an export point and an inode number of the specific file associated with the file handle in the file handle.

9. A fie server for use with one or more clients in a network environment, the file server comprising:
   means for generating a file handle of a file;
   means for encrypting the file handle by the file server to create an encrypted file handle, thereby preventing access to the file handle;
   means for creating a new entry in a hash table associated with the encrypted file handle, the hash table including one or more hash key entries, one or more encrypted file handle entries, and one or more decrypted file handle entries;
   means for returning the encrypted file handle to a client that requested access to the file;
   means for receiving from the client the encrypted file handle and a file operation;
   means for generating a hash key from the encrypted file handle to locate a hash key entry in the hash table;
   in response to determining that the hash key entry exists, means for comparing the encrypted file handle to the one or more encrypted file handle entries associated with the hash key entry to find a matching encrypted file handle entry, the matching encrypted file handle entry having a corresponding decrypted file handle entry in the hash table; and means for processing, by the file server, the file operation upon the file obtained from the corresponding decrypted file handle entry.

10. The file server of claim 9 wherein the means for creating a new entry in a hash table associated with the encrypted file handle further comprises:

means for selecting a new hash key and inserting the new hash key into the new entry;

means for placing the encrypted file handle as an encrypted file handle entry in the hash table; and means for associating a hash key entry, an encrypted file handle entry and a decrypted file handle entry as a single entry in the hash table.

11. A computer readable medium, including program instructions executing on a computer, the program instructions including instructions for performing the steps of:

maintaining a hash table, the hash table including one or more hash key entries, one or more encrypted file handle entries, and one or more decrypted file handle entries;

generating a file handle associated with a specific file;

encrypting the file handle by a file serer to create an encrypted file handle, thereby preventing access to the file handle;

returning the encrypted file handle to a device that requested access to the specific file;

transmitting to the file server, by the device, the encrypted file handle and a file operation;

generating a hash key from the encrypted file handle to locate a hash key entry in the hash table;

in response to determining that the hash key entry exists, comparing the encrypted file handle to the one or more encrypted file handle entries associated with the hash key entry to find a matching encrypted file handle entry, the matching encrypted file handle entry having a corresponding decrypted file handle entry in the hash table; and processing, by the file server, the file operation upon the specific file obtained from the corresponding decrypted file handle entry.

12. The computer readable medium of claim 11 including further instructions for performing the steps of:

creating a new entry, in the hash table, associated with the encrypted file handle in response to determining that the hash key entry associated with the encrypted file handle does not exist in the has table;

selecting a new hash key and inserting the new hash key into the new entry; and placing an unencrypted file handle in the hash table in a decrypted file handle entry, whereby the new hash key, encrypted file handle and the unencrypted file handle are associated as a single entry in the hash table.

13. A method for making file handles opaque to devices connected to the network, the method comprising:

maintaining a hash table, the hash table including one or more hash key entries, one or more encrypted file handle entries, and one or more decrypted file handle entries;

receiving a request from a client to open a specific file;

generating, by a file server, a file handle associated with the specific file;

encrypting the file handle by the file server to create an encrypted file handle, thereby preventing access to the file handle;

sending the encrypted file handle to the client;

transmitting to the file server, by the client, the encrypted file handle and a file operation;

generating a hash key from the encrypted file handle to locate a hash key entry in the hash table;

in response to determining that the hash key entry exists, comparing the encrypted file handle to one or more encrypted file handle entries associated with the hash key entry to find a matching encrypted file handle entry, the matching encrypted file handle entry having a corresponding decrypted file handle entry in the hash table; and processing, by the file server, the file operation upon the specific file associated with the corresponding decrypted file handle entry.

14. The method of claim 13, wherein the step of encrypting the file handle further comprises encrypting the file handle using a private key encryption algorithm.

15. The method of claim 13, wherein the step of encrypting the file handle further comprises encrypting the file handle using a public key encryption algorithm.

16. The method of claim 13, further comprising creating a new entry, in the hash table, associated with the encrypted file handle in response to determining the hash key entry associated with the encrypted file handle does not exist in the hash table.

17. The method of claim 16, wherein the step of creating an entry, in the hash table, associated with the encrypted file handle further comprises:

selecting a new hash key and inserting the new hash key into the new entry; and placing the unencrypted file handle in the hash table in a decrypted file handle entry, whereby the new hash key, encrypted file handle and the unencrypted file handle are associated as a single entry in the hash table.

18. The method of claim 17, wherein the hash key further comprises a subset of the encrypted file handle.

19. A method comprising:

maintaining a hash table, the hash table including one or more hash key entries, one or more encrypted file handle entries, and one or more decrypted file handle entries;

sending an open request to a file server from a client for a file, the file identified by a file handle;

encrypting the file handle by the file server to create an encrypted file handle, thereby preventing access to the file handle;

returning the encrypted file handle to the client;

transmitting to the file server, by the client, the encrypted file handle and file operation;

generating a hash key from the encrypted file handle to locate a hash key entry in the hash table;

in response to determining that the hash key entry exists, comparing the encrypted file handle to the one or more encrypted file handle entries associated with the hash key entry to find a matching encrypted file handle entry, the matching encrypted file handle entry having a corresponding decrypted file handle entry in the hash table; and processing, by the file server, the file operation upon the file associated with the corresponding decrypted file handle entry.

20. The method of claim 19 wherein the step of encrypting the file handle further comprises encrypting the file handle using a private key encryption algorithm.

21. The method of claim 19 wherein the step of encrypting the file handle further comprises encrypting the file handle using a public key encryption algorithm.

22. A server, comprising:

a file handle associated with a specific file;

a processor to encrypt the file handle to create an encrypted file handle;

the server configured to maintain a hash table that includes one or more hash key entries, one or more encrypted file handle entries, and one or more decrypted file handle entries;

the server configured to return the encrypted file handle to a device that requested access to the specific file;

the server configured to receive the encrypted file handle and file operation sent by the device;

the server configured to generate a hash key from the encrypted file to locate a hash key entry in the hash table;

the server configured to determine that the hash key entry exists in the hash table and to compare the encrypted file handle to the one or more encrypted file handle entries associated with the hash key entry to find a matching encrypted file handle entry, the matching encrypted file handle entry having a corresponding decrypted file handle entry in the hash table; and the server configured to process the file operation upon the specific file obtained from the corresponding file handle entry.

23. The server of claim 22, further comprising:

the file handle encrypted using a private key encryption algorithm.

24. The server of claim 22, further comprising:

the file handle encrypted using a public key encryption algorithm.

25. The server of claim 22, further comprising:

a new entry of the hash table created when it is determined that no hash key entry associated with the encrypted file handle exists in the hash table.

26. The server of claim 25 further comprises:

a new hash key inserted into the new entry; and an unencrypted file handle placed in the hash table in a decrypted file handle entry, whereby the new hash key, the encrypted file handle, and the unencrypted file handle are associated as a single entry in the hash table.

27. The server of claim 26, further comprising:

the hash key is a subset of the encrypted file handle.

28. The system of claim 22, further comprising:

the file handle is a 32-byte value that uniquely identifies the specific file, when the specific file is opened.

29. The system of claim 22, further comprising:

the file handle contains an export point and an inode number of the specific file associated with the file handle.

* * * * *

UNITED STATES PATENT AND TRADEMARK OFFICE
CERTIFICATE OF CORRECTION

| | | |
|---|---|---|
| PATENT NO. | : 7,603,553 B1 | Page 1 of 1 |
| APPLICATION NO. | : 10/423591 | |
| DATED | : October 13, 2009 | |
| INVENTOR(S) | : Peter F. Corbett | |

It is certified that error appears in the above-identified patent and that said Letters Patent is hereby corrected as shown below:

Col. 10, Line 48, please replace "fie" with "file"

Col. 11, Line 25, please replace "serer" with "server"

Col. 11, Line 49, please replace "has" with "hash"

Col. 12, Line 6, please replace "to one or" with "to the one or"

Col. 12, Line 49, please replace "and file" with "and a file"

Col. 13, Line 13, please replace "and file" with "and a file"

Col. 13, Line 15, please replace "file to" with "file handle to"

Col. 13, Line 24, please replace "corresponding file" with "corresponding decrypted file"

Signed and Sealed this

Thirtieth Day of November, 2010

David J. Kappos
*Director of the United States Patent and Trademark Office*